(12) United States Patent
Cui et al.

(10) Patent No.: US 11,988,416 B1
(45) Date of Patent: May 21, 2024

(54) SHALLOW GEOTHERMAL ENERGY EFFICIENT UTILIZATION AND STORAGE SYSTEM AND METHOD BASED ON DEEP LEARNING OPTIMIZATION

(71) Applicant: Shenzhen University, Guangdong (CN)

(72) Inventors: Hongzhi Cui, Guangdong (CN); Xiaohua Bao, Guangdong (CN); Xiangsheng Chen, Guangdong (CN)

(73) Assignee: Shenzhen University, Guangdong (CN)

( * ) Notice: Subject to any disclaimer, the term of this patent is extended or adjusted under 35 U.S.C. 154(b) by 0 days.

(21) Appl. No.: 18/411,562

(22) Filed: Jan. 12, 2024

(51) Int. Cl.
*F24T 10/00* (2018.01)
*G06Q 10/20* (2023.01)

(52) U.S. Cl.
CPC .............. *F24T 10/00* (2018.05); *G06Q 10/20* (2013.01); *F24T 2010/56* (2018.05)

(58) Field of Classification Search
CPC ....... F24T 10/00; F24T 2010/56; G06Q 10/20
See application file for complete search history.

(56) References Cited

U.S. PATENT DOCUMENTS

| | | | | |
|---|---|---|---|---|
| 2010/0211233 A1* | 8/2010 | Roscoe | ..................... | H02J 3/14 700/295 |
| 2013/0221929 A1* | 8/2013 | Prosser | ................. | G01R 21/00 320/135 |
| 2020/0110614 A1* | 4/2020 | Ma | ...................... | G06F 11/3024 |
| 2023/0194127 A1* | 6/2023 | Johnson | ............ | H01M 8/04164 165/45 |

FOREIGN PATENT DOCUMENTS

CN        106917728 A   *   7/2017   ............. F01D 15/10

* cited by examiner

*Primary Examiner* — Kidest Bahta
(74) *Attorney, Agent, or Firm* — Cooper Legal Group, LLC

(57) ABSTRACT

The present application relates to an efficient shallow geothermal energy utilization and storage system and method based on deep learning optimization. It includes the steps of obtaining current time information; determining theoretical energy consumption demand curve information; acquiring the heat exchange component number information and a corresponding single-member potential energy information; calculating single-member energy storage information according to the single-member potential energy information and preset efficiency threshold information; adding single-member energy storage information corresponding to the heat exchange component number information to obtain total stored energy information; calculating replacement time information according to the theoretical energy consumption demand curve information and the total stored energy information; and replacing the heat exchange component corresponding to the heat exchange component number information at the replacement time.

7 Claims, 10 Drawing Sheets

SHALLOW GEOTHERMAL ENERGY EFFICIENT UTILIZATION AND STORAGE SYSTEM AND METHOD BASED ON DEEP LEARNING OPTIMIZATION

TECHNICAL FIELD

The present application relates to the field of geothermal energy storage and utilization technologies, and, in particular, to an efficient shallow geothermal energy utilization and storage system and method based on deep learning optimization.

BACKGROUND

Shallow geothermal energy generally refers to thermal energy at a temperature of lower than 26° C. which is stored in uncontaminated rock-soil bodies, underground water and surface water in a certain depth range below the surface of the earth and has a development and utilization value. The underground temperature is relatively stable and is maintained at 16-26° C. for a long time according to different shallow layer ground temperatures of the areas. Compared with a low temperature fluctuation of the ground, the technical effects that the heat is supplied to the ground structure in winter and the coldness is supplied to the ground structure in summer can be achieved by extracting the shallow geothermal energy in a specific mode and reasonably utilizing the shallow geothermal energy. Meanwhile, the shallow geothermal energy has the advantages of cyclic regeneration, cleanness, environmental friendliness, wide distribution, huge reserve, shallow burial, capability of being developed and utilized nearby and the like, and thus can effectively reduce the emission of carbon dioxide and pollutants as a substitute resource of fossil energy.

A phase-change material is a substance which will be subjected to phase state transition under a certain temperature condition. It can absorb or release certain latent heat during the phase state transition, and is widely researched and applied as an energy storage material. A phase-change material energy structure is a recently rising energy structure combining the energy storage property of the phase-change material, in which the phase-change material is arranged in the structure, so that higher heat exchange efficiency and a more stable heat exchange process are obtained. The heat conductivity coefficient of the phase-change material is different from that of concrete, the heat conductivity of the material can be changed by adding the concrete, and the good energy storage capacity of the phase-change material is also widely researched.

In view of the related technologies, it is found that, in related technologies, the scheduling mode of geothermal energy heat exchange and energy storage is rigidified, so that the stable and comfortable experience is difficult to achieve when utilizing the clean energy efficiently, remaining a space for improvement.

SUMMARY

In order to address the problems of rigidified adjusting mode of geothermal energy heat exchange and storage, and difficult combination of high-efficient clean energy utilization and steady comfortable experience for the urban space at the same time, this application provides efficiency shallow geothermal energy high utilization storage system and method based on deep learning optimization.

In a first aspect, the present application provides an efficient shallow geothermal energy utilization and storage method based on deep learning optimization, and adopts the following technical solution.

An efficient shallow geothermal energy utilization and storage method based on deep learning optimization includes the following steps:
  acquiring current time information;
  performing matching analysis on energy consumption demand curve information stored in a preset learning database and current time information to determine an energy consumption demand curve for the current time information, and defining the energy consumption demand curve as a theoretical energy consumption demand curve information;
  acquiring a heat exchange component number information and a corresponding single-member potential energy information;
  calculating single-member energy storage information according to the single-member potential energy information and preset efficiency threshold information;
  adding single-member energy storage information corresponding to the heat exchange component number information to obtain total stored energy information;
  calculating replacement time information according to the theoretical energy consumption demand curve information and the total stored energy information;
  and replacing the heat exchange component corresponding to the heat exchange component number information at the replacement time information.

By adopting the technical solution, the energy consumption condition corresponding to each time period is predicted in advance by establishing the learning database, so that the capability of corresponding strength is provided in a targeted manner, the corresponding time nodes are replaced, the workload of artificial regulation and control is reduced, the scheduling is more intelligent, and the efficiency and the intelligence of geothermal utilization are improved.

Optionally, the method for establishing the learning database includes:
  calculating theoretical consumption rate information according to the theoretical energy efficiency demand curve information and the current time information;
  acquiring actual consumption rate information of the total stored energy information;
  calculating a difference between the theoretical consumption rate information and the actual consumption rate information according to the theoretical consumption rate information and defining the difference as consumption rate difference information;
  judging whether the consumption rate difference information exceeds a range corresponding to the preset allowable deviation range information;
  if yes, acquiring actual material proportion information;
  performing matching analysis on single-material weight information stored in a preset proportion database and actual material proportion information to determine single-material weight corresponding to the actual material proportion information, and defining the single-material weight as material weight information;
  calculating total weight information according to the actual material proportion information and the material weight information;
  calculating corrected rate change data information according to the consumption rate difference information and the total weight information;

adjusting the mapping relation between the current time information and the theoretical energy efficiency demand curve information in a target database according to the corrected rate change data information; and if no, performing no correction.

In the above technical solution, the theoretical data are corrected by adopting different proportions according to the difference of the actual heat exchange component through the deviation between the actual data and the theoretical data, so that the theoretical data complies more with the type of the heat exchange component, the actual requirements are better met, and the accuracy of the theoretical data is improved.

Optionally, if the consumption rate difference information exceeds the allowable deviation range information, the method for determining the theoretical energy consumption demand curve information includes:

acquiring a sudden energy consumption demand curve segment information in a time length corresponding to a preset interval time length information;

analyzing a same time period information according to the current time information;

randomly selecting a time length within the same time period information as a selected time period information of the interval time length information, and defining a starting time of the selected time period information as a selected time information;

performing matching analysis on the energy consumption demand curve information stored in the learning database and the selected time information to determine an energy consumption demand curve for the selected time information, and defining the energy consumption demand curve as a selected energy consumption demand curve information;

selecting a segment having a same length as that of the interval time length information in the selected energy consumption demand curve information, and defining the segment as a selected period curve information;

comparing the selected period curve information with the sudden energy consumption demand curve segment information to obtain curve coincidence degree information;

judging whether the curve coincidence degree information is larger than a preset theoretical coincidence range information;

if yes, analyzing the selected energy consumption demand curve information and the current time information to determine an adjusted energy consumption demand curve information;

updating the theoretical energy consumption demand curve information into the adjusted energy consumption demand curve information and outputting the adjusted energy consumption demand curve information; and if the selected time interval is smaller than the selected time interval, reselecting the selected time interval information and the selected time information.

By adopting the technical solution, when the data deviation is large, the shape of the corresponding curve is adapted to the curve shape experienced in the historical process, and the process experienced before the corresponding curve is simulated, so that the current emergency can be dealt with by a corresponding handling method. Further, the data is closer to reality, and the handling ability of the heat exchange component when suffering from emergency is improved.

Optionally, the method for replacing the heat exchange component corresponding to the heat exchange component number information at the replacement time information includes:

performing matching analysis on the heat exchange rate information stored in a preset consumption database, the single-member energy storage information and the current time information to determine the heat exchange rate corresponding to the current time information of the single-member energy storage information, and defining the heat exchange rate corresponding to the single-member energy storage information as a single-member heat exchange rate information;

calculating a single-member consumption time information according to the single-member heat exchange rate information and the single-member energy storage information;

judging whether the single single-member consumption time information is equal to the replacement time information;

if the single single-member consumption time information is equal to the replacement time information, placing a heat exchange component corresponding to the heat exchange component number information into a preset energy storage area for energy storage and moving the heat exchange component in the energy storage area out for energy storage at the replacement time information;

if the single single-member consumption time information is smaller than the replacement time information, placing a heat exchange component corresponding to the heat exchange component number information into the preset energy storage area for energy storage at the single-member consumption time information, and moving the heat exchange component in the energy storage area out for energy storage at the replacement time information.

By adopting the technical solution, when heat exchange of one heat exchange component is finished at the same time but not all the heat exchange components are finished at the same time, the corresponding heat exchange component can be put into the energy storage area for energy storage, so that the heat exchange component is not closed easily due to the fact that the time does not reach, the frequent opening and closing condition is avoided, and the service life of the heat exchange component is prolonged. On the other hand, the heat exchange component is placed into the energy storage device in advance, so that the heat exchange component can store energy quickly, and the energy storage efficiency of the heat exchange component is improved.

Optionally, the method for placing a heat exchange component corresponding to the heat exchange component number information into the preset energy storage area for energy storage at the single-member consumption time information, and moving the heat exchange component in the energy storage area out for energy storage at the replacement time information includes:

acquiring remaining energy storage information at the replacement time information;

defining a number information of a heat exchange component to be replaced as the current replacement member number information;

performing matching analysis on the cycling group number information stored in a preset group database and the current replacement member number information to determine the cycling group numbering in which the current replacement member number information is, and defining the cycling group number information as a replacement cycling group number information;

acquiring single-member energy storage information corresponding to other heat exchange components in the replacement cycling group number information, and defining the single-member energy storage information as single-member energy storage information;

sequencing the remaining energy storage information and single-member energy storage information corresponding to all the other heat exchange components in the replacement cycling group number information in a descending order to obtain a sequence number corresponding to the remaining energy storage information, defining the sequence number as an energy storage sequence number information, and defining a minimum sequence number as a minimum sequence number information;

acquiring position information of other heat exchange components corresponding to a sequence number adjacent to the energy storage sequence number information corresponding to the remaining energy storage information, respectively, and defining the position information as an insertion area information; and placing a heat exchange component corresponding to the current replacement member number information in the insertion area information for energy storage, and supplying energy to a heat exchange component having the minimum sequence number information as the energy storage number information.

By adopting the technical solution, when the heat exchange component needs for energy storage, the heat exchange component and the heat exchange room which is storing energy are sequenced according to the internal energy, so that the heat exchange component supplying energy is always the heat exchange component with the largest energy in the energy storage area. On one hand, the heat exchange component can supply the most energy, the replacement frequency is reduced, and the working strength is reduced. On the other hand, the heat exchange component to be less than high-efficiency threshold information is avoided, without producing the effect though the energy supply of being selected out. This avoid the heat exchange component that the energy of storage is less than high-efficiency threshold information directly to get into the energy supply regional and the condition of unable energy supply even, and improves the accuracy that heat exchange component energy storage and energy supply mode switch.

Optionally, the method for efficiently obtaining threshold information includes:

acquiring historical record information;

retrieving a latest historical efficiency threshold information and a historical replacement time information from the historical record information;

performing matching analysis on the historical replacement time information and a preset suitable time range information to determine an larger historical replacement time information, a suitable historical replacement time information and a smaller historical replacement time information;

respectively calculating proportions of larger historical replacement time information, suitable historical replacement time information and smaller historical replacement time information in the historical replacement time information, defining the proportion of the larger historical replacement time information as earlier proportion information, defining the proportion of the suitable historical replacement time information as a suitable proportion information, and defining the proportion of the smaller historical replacement time information as smaller proportion information;

judging whether the suitable proportion information is the maximum value;

if yes, outputting the efficiency threshold information as the latest historical efficiency threshold information;

if the larger proportion information or the smaller proportion information is the maximum value, performing calculation according on the larger historical replacement time information corresponding to the maximum value or the theoretical energy consumption demand curve information, the total stored energy information and the proper time range information corresponding to the smaller historical replacement time information to obtain updated efficiency threshold information; and outputting the efficiency threshold information according to the updated efficiency threshold information and updating the single-member energy storage information.

By adopting the above technical solution and calculating the proportion of time that meets the requirements in the historical process, the rationality of setting the high-efficiency threshold information can be determined, avoiding situations where the heat exchange time is short or too long each time. By setting the time reasonably, energy storage and supply can be synchronized to maintain ecological balance, and the efficiency of combining heat exchange and energy storage can be improved.

Optionally, the method for placing a current replacement member corresponding to the current replacement member number information in an insertion area corresponding to the insertion area information for energy storage and supplying energy to a heat exchange component having the minimum energy storage sequence number information includes:

defining the remaining energy storage information corresponding to the current replacement member number information as the removed remaining energy storage information;

performing matching analysis on the heat exchange rate information stored in the consumption database and the removed remaining energy storage information to determine the heat exchange rate corresponding to the removed remaining energy storage information, and defining the heat exchange rate corresponding to each removed remaining energy storage information as the lost heat exchange rate information;

sequencing the single-member heat exchange rate information according to the energy storage sequence number information to obtain heat exchange rate increasing sequence number information;

calculating a sum of any number of the single-member heat exchange rate information according to the heat exchange rate increasing sequence number information to obtain a total increased heat exchange rate information of different number of the heat exchange components;

calculating the absolute value of a difference between the total increased heat exchange rate information and the lost heat exchange efficiency information, and defining the absolute value as sudden change difference information;

screening out total increased heat exchange rate information with a minimum absolute value, defining the total increased heat exchange rate information as actual switching heat exchange rate information, and defining the numbering corresponding to the actual switching heat exchange rate information as actual switching number information;

calculating critical sequence number information according to the actual switching number information and a minimum sequence number information; and supplying energy to the heat exchange components corresponding to information from the minimum sequence number information to the critical sequence number information.

By adopting the above technical solution, when a single energy storage device cannot meet the switching requirements, multiple sorting energy storage devices are combined to meet the requirements, making it less likely to cause significant deviations during the replacement process and resulting in unstable system fluctuations, thereby improving the smoothness and stability of system switching.

Optionally, a method for supplying energy to the heat exchange components corresponding to the information from the minimum sequence number information to the critical sequence number information includes:

calculating a difference between the actual switching heat exchange rate information and the lost heat exchange rate information, and defining the difference as a sudden change difference information;

judging whether the sudden change difference information is equal to 0;

if yes, supplying energy to the heat exchange components from the minimum sequence number information to the critical sequence number information;

if not, acquiring a working state information of all the heat exchange components;

judging whether preset standby state information exists in the working state information or not;

there is no preset standby state information, starting a preset external energy storage device is started to store or supply energy according to a positive or negative value of the sudden change difference information;

if there is a preset standby state information, acquiring the heat exchange component number information in the standby state, and defining this heat exchange component number information as a standby heat exchange component number information;

judging whether the single-member energy storage information of the standby heat exchange component number information is equal to the sudden change difference information or not;

if yes, temporarily starting the heat exchange component corresponding to the standby heat exchange component number information to work and gradually stopping the heat exchange component; and if no, starting a preset external energy storage device to store or supply energy according to the positive and negative value of the sudden change difference information.

By adopting the above technical solution, when the energy storage generated by all combinations of heat exchange components cannot match the replaced heat exchange components, the non-operated heat exchange components or external energy storage devices can be started simultaneously for energy supply, reducing the fluctuation at this moment and improving the smoothness of replacement.

Optionally, the method further includes a method for determining the heat exchange component, including:

judging whether a numerical value of any point on the theoretical energy consumption demand curve information is larger than a preset demand threshold information, and defining the numerical value of any point on the theoretical energy consumption demand curve information as a current heat exchange demand information;

if yes, acquiring local concrete material proportion information;

performing matching analysis on a heat conduction property information stored in a preset energy storage database and the current concrete material information to determine the heat conduction property corresponding to the current concrete material information, and defining the heat conduction property as a single-material heat conduction property information;

calculating a total concrete heat conduction property information according to the single-material heat conduction property information and the current concrete material proportion information;

acquiring the heat exchange component number information and the corresponding heat conduction property information, and defining the heat conduction property information as the current heat conduction property information;

judging whether the current heat conduction property information is larger than the total concrete heat conduction property information;

if the total heat conduction property information is larger than the total concrete heat conduction property information, judging whether the high-demand threshold information is larger than the theoretical maximum information corresponding to the current heat conduction property information;

the demand threshold information is larger than the theoretical maximum information, replacing the heat exchange component by a preset high heat conduction sleeve for heat exchange;

the demand threshold information is smaller than the theoretical maximum information, acquiring the current phase-change material type information corresponding to the heat exchange component number information;

performing matching analysis on the theoretical phase-change material content information stored in a preset content database, the current phase-change material type information and high-demand threshold information to determine the theoretical phase-change material content corresponding to the current phase-change material type information and the high-demand threshold information, and defining the theoretical phase-change material content as matched phase-change material content information;

adjusting the phase-change material content information in the serial heat exchange component number information according to the matched phase-change material content information;

if the total concrete heat conduction property information is less than the total concrete heat conduction property information, performing matching analysis on the type information of the phase-change material stored in a preset property database and the phase-change material current type information to determine the type of the phase-change material with a property higher than that of the phase-change material current type information, and defining the type of the phase-change material as a preferred phase-change material type information;

replacing the heat exchange component number information according to the preferred phase-change material type information; and if the high demand threshold information is less than the high demand threshold information, performing no adjustment.

By adopting the above technical solution, when a large heat transfer performance is required, the thermal conductivity of the current heat exchange component and the thermal conductivity of the concrete can be determined to determine whether the thermal conductivity of the existing heat exchange component meets the requirements. Compared with the energy storage performance, when it does not meet the requirements, it can be replaced with phase change materials with better thermal conductivity, which can improve the overall thermal conductivity of the structure and reduce the loss of thermal storage capacity, thus meeting the actual local needs, improving the on-site adaptability and intelligence of heat exchange structures.

In a second aspect, the present application provides an efficient shallow geothermal utilization storage system based on deep learning optimization, which adopts the following technical solution:

an efficient shallow geothermal utilization storage system based on deep learning optimization comprises:

the acquiring module, configured for acquiring current time information, heat exchange component number information, single-member potential energy information, actual consumption rate information, actual material proportion information, sudden energy consumption demand curve segment information, remaining energy storage information, single-member energy storage information, insertion area information, historical record information and current heat conduction property information;

a memory, configured for storing the program of the control method of the efficient shallow geothermal energy utilization and storage method based on the deep learning optimization; and a processor, configured for loading executing the program in the memory, and implementing the control method for the shallow geothermal energy utilization and storage method based on deep learning optimization.

By adopting the above technical solution and establishing a learning database to predict the energy consumption situation corresponding to each time period in advance, the ability to provide targeted corresponding strength is provided, and replacement is carried out at corresponding time nodes, reducing the workload of manual regulation, making adjusting more intelligent, and improving the efficiency and intelligence of geothermal utilization.

To sum up, the present application can achieve at least the following beneficial technical effects:

1. By predicting the energy consumption corresponding to each time period in advance, the workload of manual regulation is reduced, making adjusting more intelligent and improving the efficiency and intelligence of geothermal utilization; and
2. By sequencing, the accuracy of energy storage and supply mode switching of heat exchange components is improved by avoiding the situation where the stored energy is lower than the high-efficiency value and cannot be supplied directly into the energy supply area.

DETAILED DESCRIPTION

In order to make the objects, technical solutions and advantages of the present application more clearly understood, the present application is further described in detail below with reference to FIGS. 1-10 and embodiments. It should be understood that the specific embodiments described herein are merely illustrative of and not restrictive on the present application.

Figure 1:
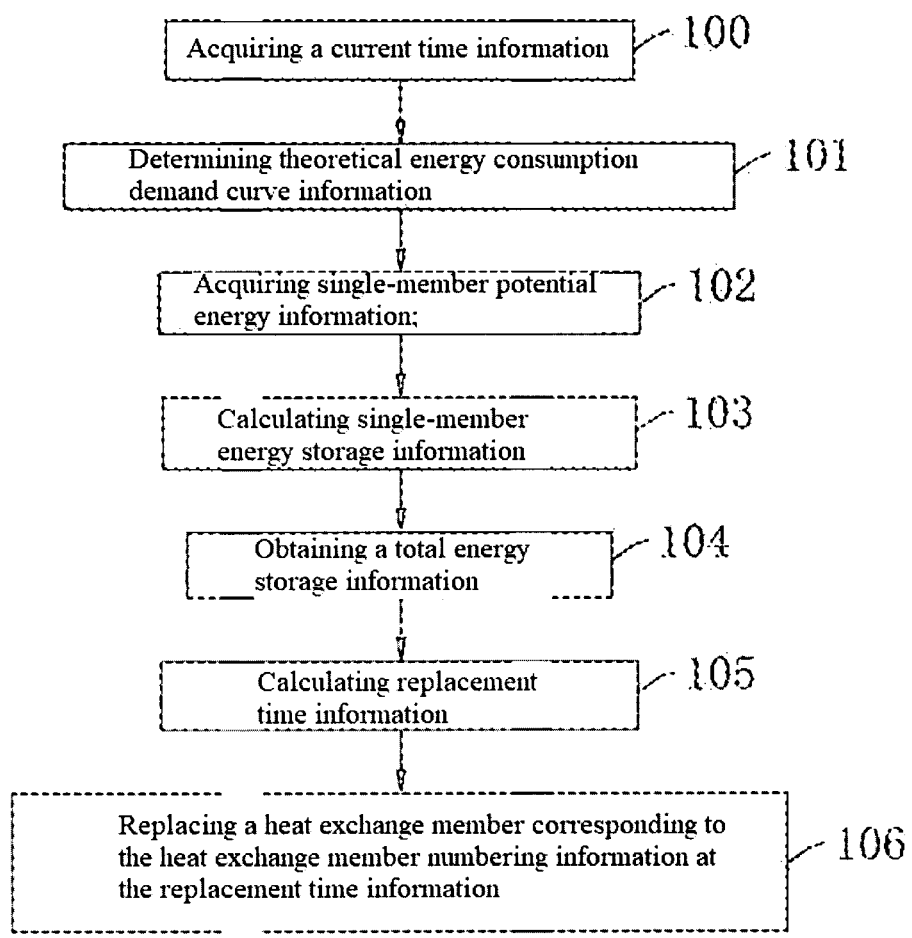
FIG. 1 is a flowchart of an efficient shallow geothermal utilization and storage method based on deep learning optimization in an embodiment of the present application.

The embodiment of the present application discloses an efficient shallow geothermal energy utilization and storage method based on deep learning optimization. Referring to FIG. 1, the efficient shallow geothermal energy utilization and storage method based on deep learning optimization includes the following steps:

step 100: acquiring current time information.

The current time information is the time that is lasting, and includes year, month, day, season and time information. The acquiring method may be any method for acquiring time, for example, retrieving from a standard time website on the internet, and the last acquired time content includes, for example: ten a.m. on Sep. 10, 2022, autumn.

step 101: performing matching analysis on an energy consumption demand curve information stored in a preset learning database and the current time information to determine an energy consumption demand curve for the current time information, and defining the energy consumption demand curve as a theoretical energy consumption demand curve information.

The theoretical energy consumption demand curve information is an information of energy which needs to be theoretically consumed after the corresponding time node begins. The database stores the mapping relation between the energy consumption demand curve information and the current time information, the system records corresponding energy consumption at every moment every day and then strings the corresponding energy into a curve, and a detection device is arranged at each position of the system to monitor power and temperature, such as a power meter and a temperature sensor. The detection device includes an external transmission power monitoring device, a heat exchange module heat exchange power monitoring device, a heat exchange module peripheral soil body temperature monitoring device, an external environment temperature monitoring device, a weather state monitoring device, a phase-change material phase state monitoring device, an energy storage power monitoring device and the like. When the system receives the current time information, the corresponding energy consumption demand curve is automatically retrieved from the database, and output as the theoretical energy consumption demand curve information.

step 102: acquiring a heat exchange component number information and corresponding single-member potential energy information.

The heat exchange component number information is an information of the numbering of the heat exchange component as the heat exchange means. The heat exchange component is a heat conducting component capable of exchanging heat with soil and flowing water in the embodiment, for example: a phase-change material. The single-member potential energy information is chemical potential energy information of one of the heat exchange components. It can be obtained by a phase-change material phase-state monitoring device. The potential energy storage capacity of the phase-change material can be judged according to the percentage of different phase states, and then the potential energy is determined.

step 103: calculating single-member energy storage information according to the single-member potential energy information and a preset efficiency threshold information.

The single-member energy storage information is an information of energy which can be output by the heat exchange component under the condition of ensuring the heat exchange efficiency. The efficiency threshold information is a critical value information capable of conducting heat quickly. The efficiency threshold information is a numerical value set manually. The way of calculation includes calculating a difference between the two information.

step 104: calculating a sum of the single-member energy storage information corresponding to the heat exchange component number information to obtain a total stored energy information.

The total stored energy information is an information of energy which can be provided by all the heat exchange components that are working. The calculating method includes calculating a sum of values.

step 105: calculating a replacement time information according to the theoretical energy consumption demand curve information and the total stored energy information.

The replacement time information is information of time for replacing the heat exchange component that is supplying energy. Actually, it is also the information of the corresponding time when the total consumption amount reaches the total stored energy information when the consumption is performed according to the theoretical energy consumption demand curve information. The calculating method includes finding a corresponding abscissa value when the area enclosed by the theoretical energy consumption demand curve information and the time as the abscissa is equal to the total stored energy information.

step 106: replacing the heat exchange component corresponding to the heat exchange component number information at the replacement time information.

At the replacement time, the heat provided by all the heat exchange components is the heat corresponding to the total stored energy information, and the heat exchange components start to be replaced at the replace time so as to provide the energy storage value of the next stage for energy supply.

Figure 2:
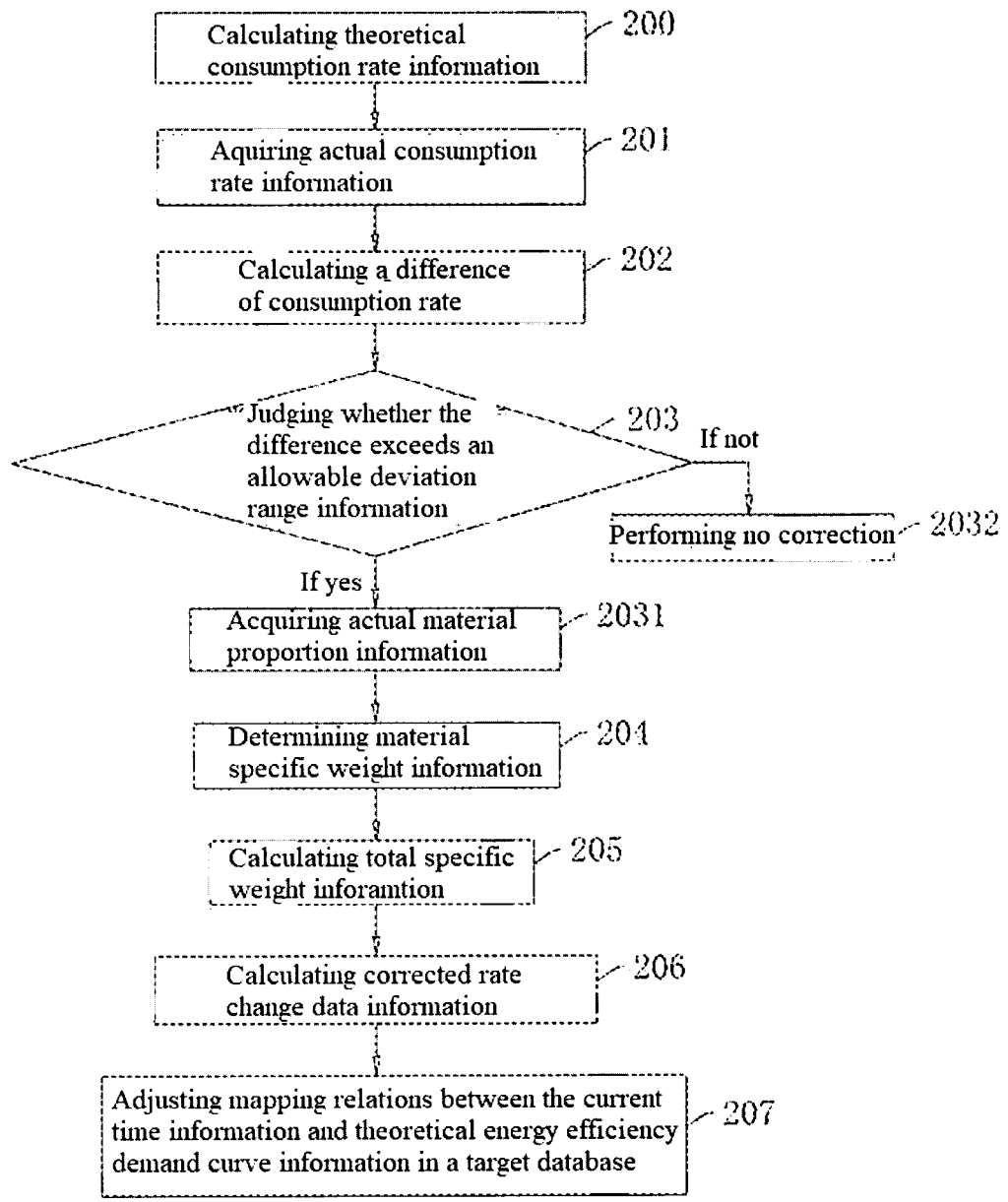
FIG. 2 is a flowchart of a method for establishing a learning database in an embodiment of the present application.

Referring to FIG. 2, the method for establishing a learning database includes:

step 200: calculating a theoretical consumption rate information according to the theoretical energy efficiency demand curve information and the current time information.

The theoretical consumption rate information is information of the consumption rate of the theoretical energy efficiency demand curve information at the current time information. The calculating method includes selecting two points on the theoretical energy efficiency demand curve information, wherein a first point is at current time, and a second point is at a certain time interval after the current time. The theoretical consumption rate information is obtained after the time interval is infinitely reduced, which is actually a numerical value corresponding to the inclination of a tangent of the theoretical energy efficiency demand curve information at the current time, in which a downward inclination has a positive value.

step 201: acquiring actual consumption rate information of the total stored energy information.

The actual consumption rate information is information of the consumption rate of the total stored energy information in unit time. In an embodiment of the present application, the total stored energy information is detected in real time, and a curve of the total stored energy information is also generated. Then the corresponding inclination value is obtained according to the slope of the curve. The acquiring manner includes calculating a difference between obtained front and back numerical values of the total stored energy information.

step 202: calculating a difference between the theoretical consumption rate information and the actual consumption rate information and defining the difference as a consumption rate difference information.

The consumption rate difference information is an information of a difference between the theoretical consumption rate information and the actual consumption rate information, and is actually information of a difference between theoretical data and data actually in use. Here, the heat conversion on the heat exchange component is used by an external equipment, and the use power of the external equipment is monitored.

step 203: judging whether the consumption rate difference information exceeds a range corresponding to a preset allowable deviation range information.

The allowable deviation range information is a manually defined range within which a deviation is allowed, for example, 5%.

step 2031: if yes, acquiring an actual material proportion information.

If yes, it indicates that the deviation is relatively great, and the value needs to be adjusted to increase the accuracy of the data in the learning database. The actual material proportion information is an information of proportion of individual material parts in the whole heat exchange capacity. It also includes a mapping relation of the types and the proportions of the materials. It is obtained by manual measurement and input.

step 2032: if no, performing no correction.

If the deviation is within the allowable deviation range information, the deviation is considered to be a reasonable range, the current heat exchange requirement can be met, the operation is performed according to the forecast of the database, and no other operations are needed.

step 204: performing matching analysis on a single-material weight information stored in a preset proportion database and the actual material proportion information to determine a single-material weight corresponding to the actual material proportion information, and defining the single-material weight as a material weight information.

The material weight information is information of a ratio of heat exchange capacity of each of individual materials in the heat exchange capacity. For example, if the heat exchange capacity of concrete accounts for 20% of the whole heat exchange capacity, the weight of the concrete is 0.2; and if the heat exchange capacity of the phase-change material accounts for 60% of the whole heat exchange capacity, the weight of the phase-change material is 0.6. The database stores the mapping relation between the single-material weight information and the actual material proportion information, and the mapping relation is actually the mapping relation between the single-material weight information and the material type. The heat exchange capacity is calculated and input manually according to the heat exchange capacity in an actual engineering project. When the system receives the material types in the actual material proportion information, a corresponding single-material weight is automatically retrieved from the database and is output as the material weight information.

step 205: calculating a total weight information according to the actual material proportion information and the material weight information.

The total weight information is information of the weight of changes in the consumption capacity on the heat exchange component. The calculating method includes calculating products by multiplying the actual material proportion information and the material proportion information of each of the materials and calculating a sum of the products. Since the actual heat conduction capacity is related to the heat conduction capacity of the heat exchange component, the total weight information is provided, so as to correct abnormal data, and, in turn, the database.

step 206: calculating corrected rate change data information according to the consumption rate difference information and the total weight information.

The corrected rate change data information is information of the corrected consumption rate difference. The calculation method includes calculating a product of the two information.

step 207: adjusting the mapping relation between the current time information and the theoretical energy efficiency demand curve information in a target database according to the corrected rate change data information.

The correction method includes adding the correction rate change data information to an ordinate value of the theoretical energy efficiency demand curve information, wherein the ordinate value is an information of required instantaneous energy consumption. Then taking the theoretical energy efficiency demand curve information as one curve, the average value of the curves is calculated to obtain the reddest curve graph, and the theoretical energy efficiency demand curve information is output, which forms a mapping relation with the current time information to increase the accuracy of a prediction model.

Figure 3:
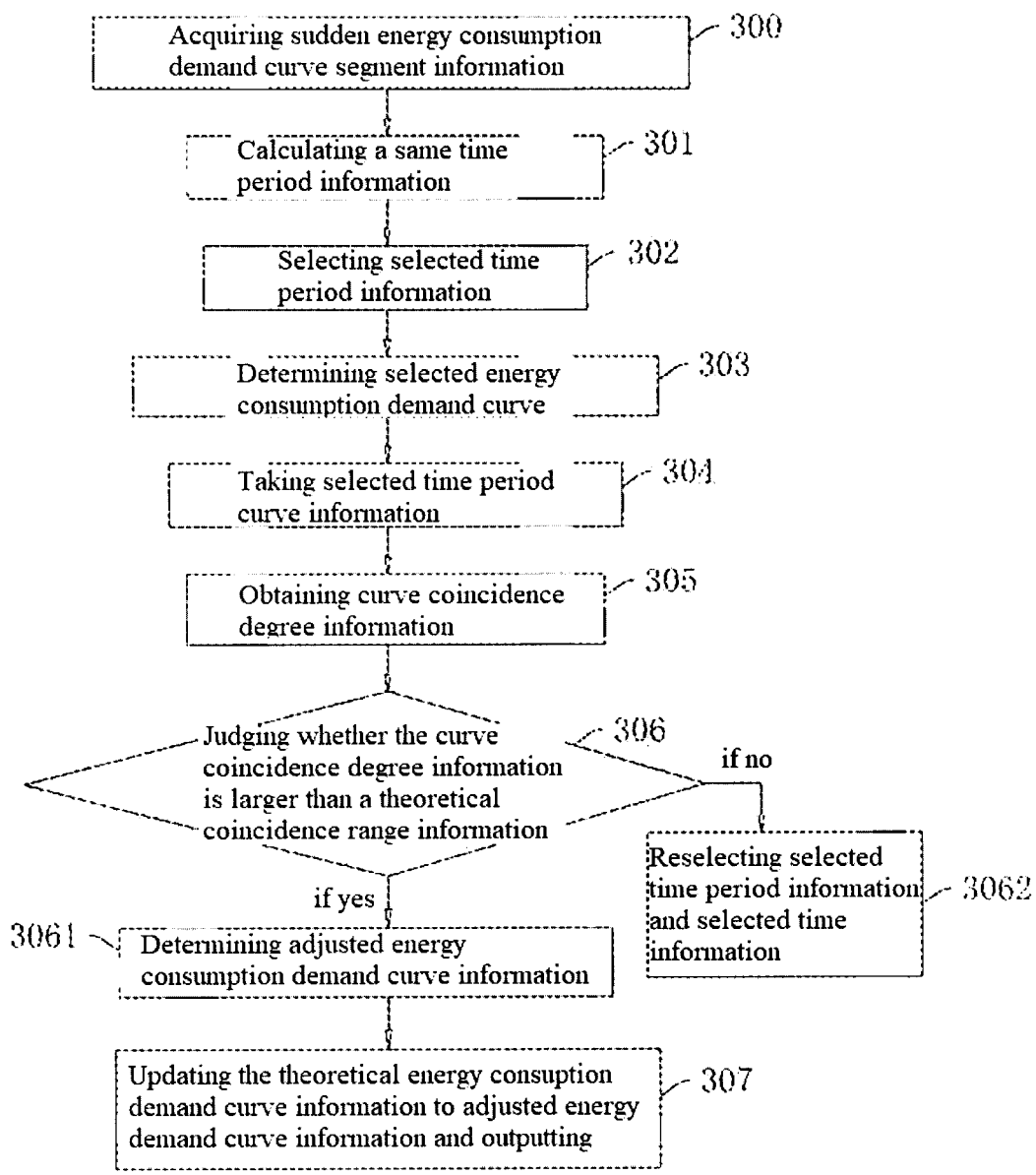
FIG. 3 is a flowchart of a method for determining theoretical energy consumption demand curve information when consumption rate difference information exceeds allowable deviation range information in an embodiment of the present application.

Referring to FIG. 3, if the consumption rate difference information exceeds the allowable deviation range information, the method for determining the theoretical energy consumption demand curve information includes:

step 300: acquiring a sudden energy consumption demand curve segment information in a time length corresponding to a preset interval time length information.

The interval time length information is information of a time length specified manually. The sudden energy consumption demand curve segment information is information of a curve segment on a prediction model curve in which data are abnormal from those in the database within a time length corresponding to the interval time length information. The acquiring manner includes real-time monitoring and is consistent with the total stored energy information, which is not described herein again.

step 301: finding a same time period information according to the current time information.

The same time period information is information of a time period within a same time node as that for the current time information, or an information of all the time nodes included in an upper level time period. For example, the current time information is 2:20 pm, Sep. 10, 2021, and a same time period as that for the current time information environment is the same time period information, for example, 1 to 3 o'clock pm, Sep. 10, 2021. Alternatively, it can be 2:20 pm, September 10, in 2020 or earlier years. The finding manner includes extending the time node to the left and the right by half an hour or other time periods, or finding the same time node before the time node.

step 302: randomly selecting a time length within the same time period information as a selected time period information of the interval time length information, and defining a starting time of the selected time period information as a selected time information.

The selected time information is an information of equal time segments taken in the same time period information. The selected time information is start point information of a selected period information.

step 303: matching the energy consumption demand curve information stored in the learning database with the selected time information to determine an energy consumption demand curve for the selected time information, and defining the energy consumption demand curve as a selected energy consumption demand curve information.

The selected energy consumption demand curve information is information of the energy consumption demand curve started by the selected time information. The database is established in a same step as step 101, and when the system receives the selected time information, the energy consumption demand curve information with the selected time information as a starting point is automatically output.

step 304: selecting a segment having a same length as that of the interval time length information in the selected energy consumption demand curve information, and defining the segment as a selected period curve information.

The selected period curve information is information of a curve segment having a length equal to that of the interval time length information. The taking method includes taking a curve segment information that starts from the selected time information and has a length equal to that of the interval time length information.

step 305: comparing the selected period curve information with the sudden energy consumption demand curve segment information to obtain curve coincidence degree information.

The curve coincidence degree information is an information of a coincidence degree between two curves, which, here, are two curves of the selected period curve information and the sudden energy consumption demand curve segment information that have the same transverse length. The curve coincidence degree information can be obtained by the discrete Fréchet distance method.

step 306: judging whether the curve coincidence degree information is larger than a preset theoretical coincidence range information.

The theoretical coincidence range information is an manually set numerical value, for example, 95%. The purpose of the judgment is to find similar curves.

step 3061: if yes, analyzing the selected energy consumption demand curve information and the current time information to determine an adjusted energy consumption demand curve information.

The adjusted energy consumption demand curve information is an information of the curve changed after selecting the starting point of the energy consumption demand curve information as the current time information, in which the curvature of the selected energy consumption demand curve information is placed at the current time information, and the starting point is the abscissa and the ordinate of the theoretical energy consumption demand curve at the current time. Since the curve coincidence degree information is larger than a preset theoretical coincidence range information, it indicates that the situation is an emergency situation, for example, it turns from a sunny day to a rainy day, which results in inaccurate measured data, and thus, entails a search for the situation of energy consumption change under similar situations and in rainy days to perform adjustment prejudgment. In order to ensure similar situations, it is possible to determine whether a previous curve can be used according to the similarity of the selected segments.

step 3062: if no, reselecting the selected time period information and the selected time information.

If the curve coincidence degree information is smaller than the preset theoretical coincidence range information, it indicates that the requirement is not met, and the information are reselected until there is no emergent situation. It needs to be noted that, if there is no emergent situation, alarm information is output to remind a user that a historical emergent situation cannot be found, that is, there is no such emergent situation ever before.

step 307: updating the theoretical energy consumption demand curve information into the adjusted energy consumption demand curve information and outputting the adjusted energy consumption demand curve information.

Here are only measures to be taken to cope with the emergent situation happening at the current time node, and how to let the database learn can be performed according to steps 200-207.

Figure 4:
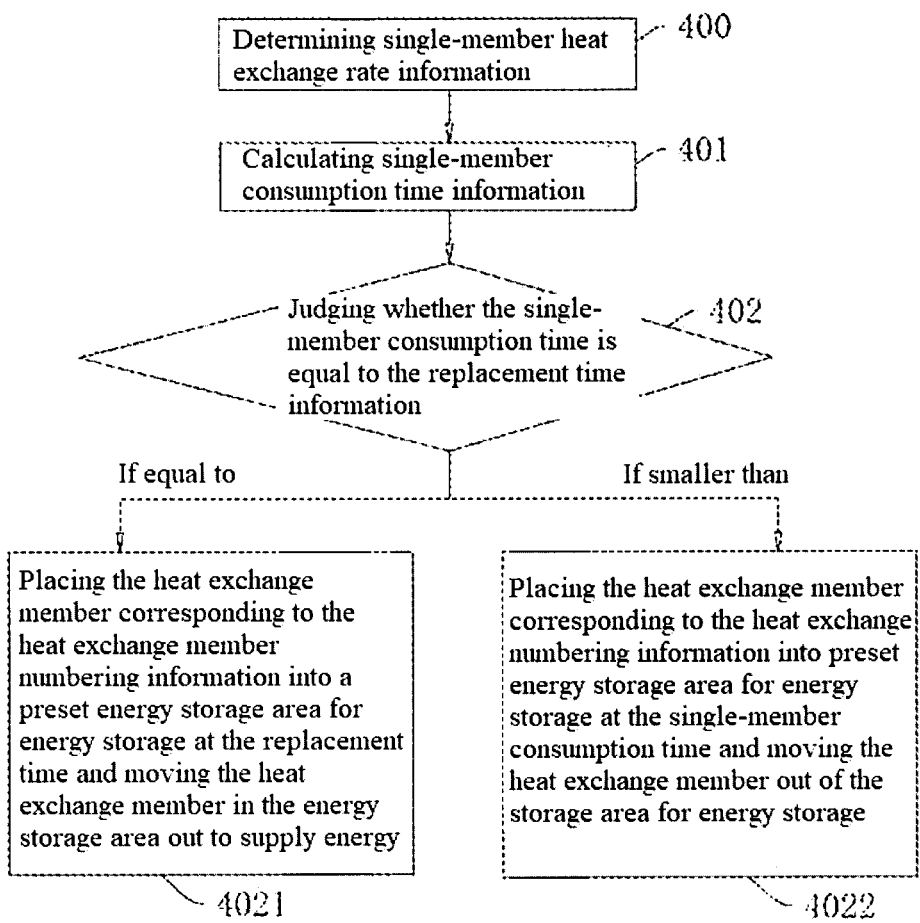
FIG. 4 is a flowchart of a method for replacing a heat exchange component corresponding to the heat exchange component number information at replacing time in an embodiment of the present application.

Referring to FIG. 4, a method for replacing the heat exchange component corresponding to the heat exchange component number information when the heat exchange component is replaced includes:

step 400: performing matching analysis on the heat exchange rate information and the single-member energy storage information stored in a preset consumption database and the current time information to determine the heat exchange rate corresponding to the current time information and the single-member energy storage information, and defining the heat exchange rate corresponding to the single-member energy storage information as a single-member heat exchange rate information.

The single-member heat exchange rate information is an information of a speed at which the single heat exchange component supplies energy to an external device. The database stores mapping relations between the heat exchange rate information, the single-member energy storage information and the current time information, and the mapping relations are obtained by inputting according to local conditions by workers in the field, namely, the mapping relations are obtained by observing test records under different single-member energy storage information and at different time nodes by a user. When the system receives the single-member energy storage information and the current time information, the corresponding single-member heat exchange rate information is autocratically retrieved from the database.

step 401: calculating the single-member consumption time information according to the single-member heat exchange rate information and the single-member energy storage information.

The single-member consumption time information is an information of time for completely consuming the single-member energy storage information, which is calculated by dividing the single-member energy storage information by the single-member heat exchange rate information. As the single-member heat exchange rate information changes along with the change of time, when the sectional area between the obtained curve and the coordinate system is equal to the single-member energy storage information, the obtained intersection point with the abscissa is the single-member consumption time information.

step 402: judging whether the single-member consumption time information is equal to the replacement time information.

The purpose of the judgment is to determine whether it is the last heat exchange component to be completed.

step 403: if yes, the heat exchange component corresponding to the heat exchange component number information is placed into a preset energy storage area for energy storage at the replacement time and the heat exchange component in the energy storage area is moved out to supply energy.

If the single-member consumption time information is equal to the replacement time information, it is indicated that it is the last heat exchange component, and all the heat exchange components which work before cannot be used or have poor heat exchange efficiency, and the heat exchange components need to return to the soil for energy storage. Then the heat exchange components corresponding to the heat exchange component number information are placed into the preset energy storage area for energy storage at the replacement time and the heat exchange components in the energy storage area are moved out for energy supplying.

step 404: if the single-member consumption time information is smaller than the replacement time information, the heat exchange component corresponding to the heat exchange component number information is put into a preset energy storage area for energy storage at the single-member consumption time, and the heat exchange components in the energy storage area are moved out to supply energy at the replacement time.

If the single-member consumption time information is smaller than the replacement time information, the other members are still supplying energy. The members are generally replaced at the same time in order to prevent the power from fluctuating due to sudden energy rush.

Figure 5:
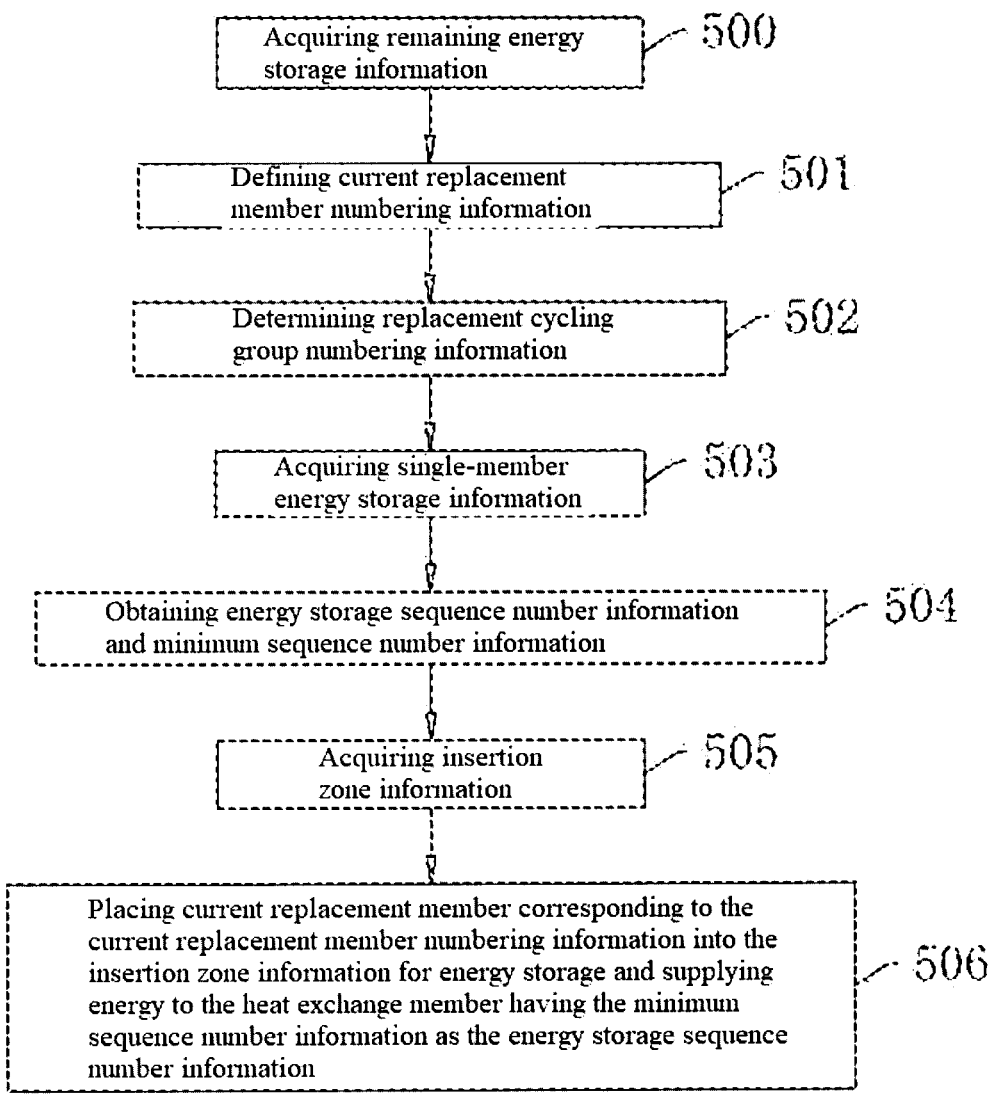
FIG. 5 is a flowchart of a method for placing a heat exchange component corresponding to the heat exchange component number information into a preset energy storage area for energy storage and removing the heat exchange component in the energy storage area for energy supplying at replacing time in an embodiment of the present application.

Referring to FIG. 5, a method for placing the heat exchange component corresponding to the heat exchange component number information into a preset energy storage area for energy storage at the replacement time and moving the heat exchange component in the energy storage area out to supply energy includes:

step 500: acquiring remaining energy storage information at the replacement time.

The remaining energy storage information is information of the remaining energy of the heat exchange component corresponding to the heat exchange component number information at the replacement time. The energy storage capacity of the phase-change material can be judged according to the percentage of different phase states, and then the energy storage is determined. Here it approximately equals to an efficiency threshold information.

step 501: defining an number information of a heat exchange component to be replaced as a current replacement member number information.

The current replacement member number information is an information of the numbering of the heat exchange component to be replaced.

step 502: performing matching analysis on a cycling group number information stored in the preset group database and the current replacement member number information to determine the cycling group numbering in which the current replacement member number information is, and defining the cycling group numbering as a replacement cycling group number information.

The replacement cycling group number information is an information of the replacement cycling group in which the current replacement member number information is. The heat exchange components in the group is transported here on an endless conveyor belt which passes through the energy supply region and the energy storage region, the heat exchange components being arranged in an end-to-end manner. The database stores the mapping relation between the cycling group number information and the current replacement member number information, and the mapping relation is obtained by recording data according to actual numberings by workers in the field. When the system receives the corresponding current replacement member number information, a corresponding cycling group number is automatically retrieved from the database and output as the replacement cycling group number information.

step 503: acquiring a single-member energy storage information corresponding to other heat exchange components in the replacement cycling group number information respectively, and defining the single-member energy storage information as single-member energy storage information.

The single-member energy storage information is the single-member energy storage information corresponding to other heat exchange components in the same replacement cycling group number information. It can be obtained by the same method as that for the single-member energy storage information, and is not described herein again.

step 504: sequencing the remaining energy storage information and the single-member energy storage information corresponding to all the other heat exchange components in the replacement cycling group number information in a descending order to obtain a sequence number corresponding to the remaining energy storage information, defining the sequence number as an energy storage sequence number information, and defining the smallest sequence number as a minimum sequence number information.

The energy storage sequence number information is an information of sequence numbers of the single-member energy storage information corresponding to all the heat exchange components in a same replacement cycling group number information and the remaining energy storage information corresponding to the current replacement member number information after sequencing in a descending order. The minimum sequence number information is the energy storage sequence number information with the minimum sequence number. The single-member energy storage information corresponding to the minimum sequence number information is the largest.

step 505: acquiring a position information of other heat exchange components corresponding to a sequence number next to the energy storage sequence number information corresponding to the remaining energy storage information, respectively, and defining the position information as an insertion area information.

The insertion area information is an information of a positions of the heat exchange components corresponding to a sequence number before or after the sequence number corresponding to the remaining energy storage information after sequencing. The acquiring method includes providing each of the heat exchange components with a position sensor, and then the position of the position sensor is located.

step 506: placing a current replacement member corresponding to the current replacement member number information in an insertion area corresponding to the insertion area information for energy storage and supplying energy to a heat exchange component having the minimum energy storage sequence number information.

During the placing, one heat exchange component with a smaller sequence number is moved forward, and a heat exchange component having a larger sequence number is clamped by a clamping tool. Then a heat exchange component corresponding to the current replacement member number information is putting into a gap between them, so that the heat exchange component having the minimum energy storage sequence number information is supplied with energy and the heat exchange component that is moved out for supply energy has the largest internal stored energy.

Figure 6:
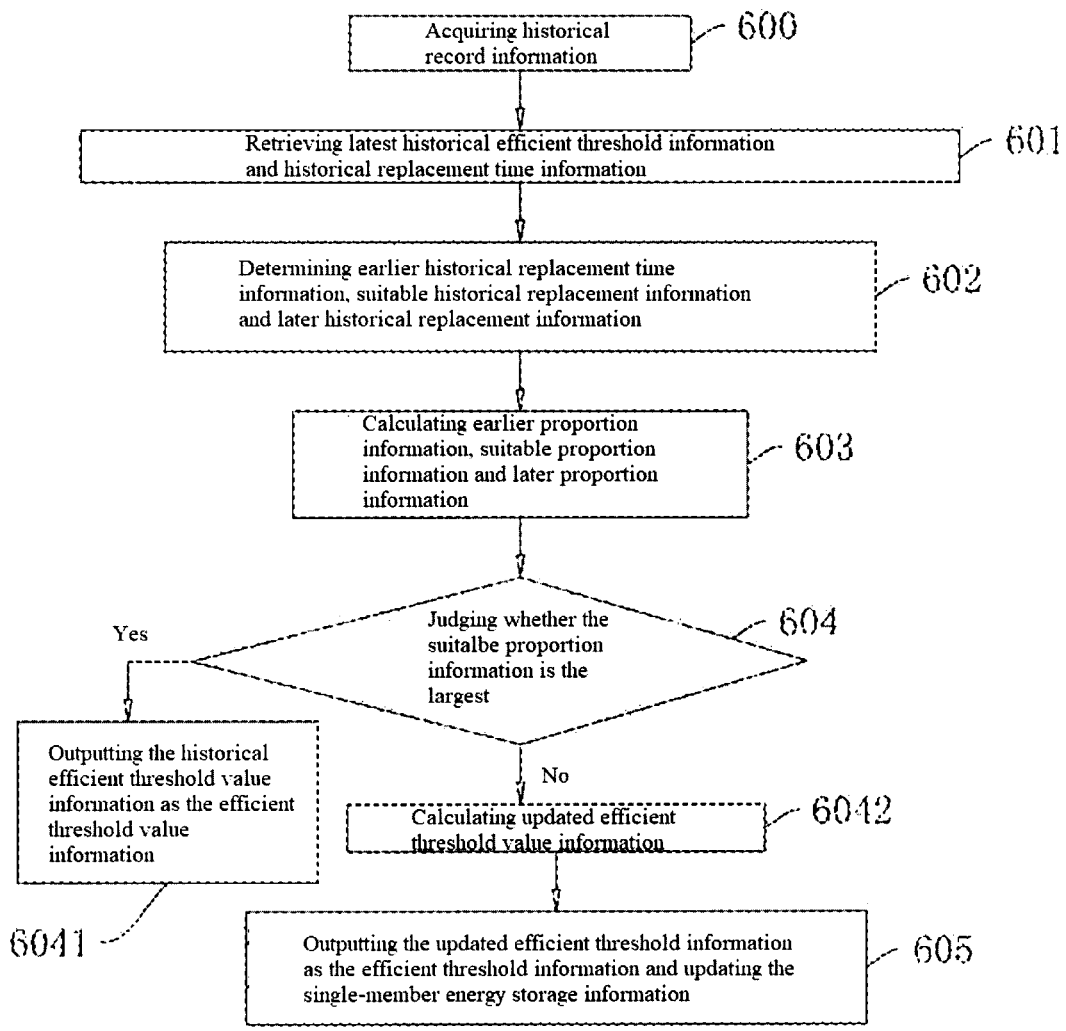
FIG. 6 is a flowchart of a method of efficiency threshold information in an embodiment of the present application.

Referring to FIG. 6, a method for acquiring efficiency threshold information includes:

step 600: acquiring historical record information.

The history information is information of a record for each replacement in the history process. The acquisition method includes a database calling method, that is, recording all contents from the beginning of each replacement to the next replacement as one record.

step 601: retrieving a latest historical efficiency threshold information and a historical replacement time information from the historical record information.

The latest historical efficiency threshold information is an information of the latest efficient threshold in the history, namely the latest efficient threshold. The historical replacement time information is replacement time information in the history.

step 602: performing matching analysis on the historical replacement time information and a preset proper time range information to determine a larger historical replacement time information, a proper historical replacement time information and a smaller historical replacement time information.

The suitable time range information is a range information of suitable time, which is a time range set manually. The larger historical replacement time information is the historical replacement time information larger than the suitable time range. The suitable historical replacement time information is a historical replacement time information within a suitable time range. The smaller historical replacement time information is a historical replacement time information smaller than the suitable time range. The matching is performed by value comparison. If the time value of the historical replacement time information is greater than a maximum value of the suitable time range, it is defined as the larger historical replacement time information. If the time is within the suitable time range, it is defined as the suitable historical replacement time information. If the time is less than a minimum value of the suitable time range, the replacement time information is defined as the smaller historical replacement time information.

step 603: calculating proportions of the larger historical replacement time information, the suitable historical replacement time information and the smaller historical replacement time information in the historical replacement time information, respectively, defining a proportion of the larger historical replacement time information as a larger proportion information, a proportion of the suitable historical replacement time information as a suitable proportion information, and a proportion of the smaller historical replacement time information as a smaller proportion information.

The larger proportion information is the proportion of the number of times of the larger historical replacement time information in the historical replacement time information. The suitable proportion information is the proportion of the number of times of the suitable historical replacement time information in the historical replacement time information. The smaller proportion information is the proportion of the smaller historical replacement time information. The calculating method includes dividing the numbers of the larger historical replacement time information, the suitable historical replacement time information or the smaller historical replacement time information by a number of the historical replacement time information.

step 604: judging whether the suitable proportion information is the largest among them.

The purpose of the judgment is to determine whether the suitable proportion information is set reasonably.

step 6041: if yes, outputting the latest historical efficiency threshold information as the efficiency threshold information.

If the efficiency threshold information falls into the threshold information, it indicates that the efficiency threshold information is reasonably set, and the latest historical efficiency threshold information is output as the efficiency threshold information.

step 6042: if the larger proportion information or the smaller proportion information is the maximum among them, performing calculation on corresponding to the theoretical energy consumption demand curve information corresponding to the maximum that corresponds the larger historical replacement time information or the smaller historical replacement time information, the total stored energy information and the proper time range information to obtain an updated efficiency threshold information.

The updated efficiency threshold information is an information of an efficiency threshold set when most of the replacement time is within the range of the suitable time range information. If the other two are larger, the setting is unreasonable, and thus the total stored energy information is continuously revised according to each of the demand cures so that all the data finally fall into the appropriate time range information or fall into the time range as much as possible, leading to reasonable set value. When the large proportion information is the maximum, the threshold is not easy to reach, and a long-time work will lead to untimely energy storage and, in turn, untimely replacement. When the smaller proportion information is the maximum, the threshold is reached quickly, leading to frequent replacements, which leads to unstable replacement.

step 605: outputting the updated efficiency threshold information as the efficiency threshold information and updating the single-member energy storage information.

Figure 7:
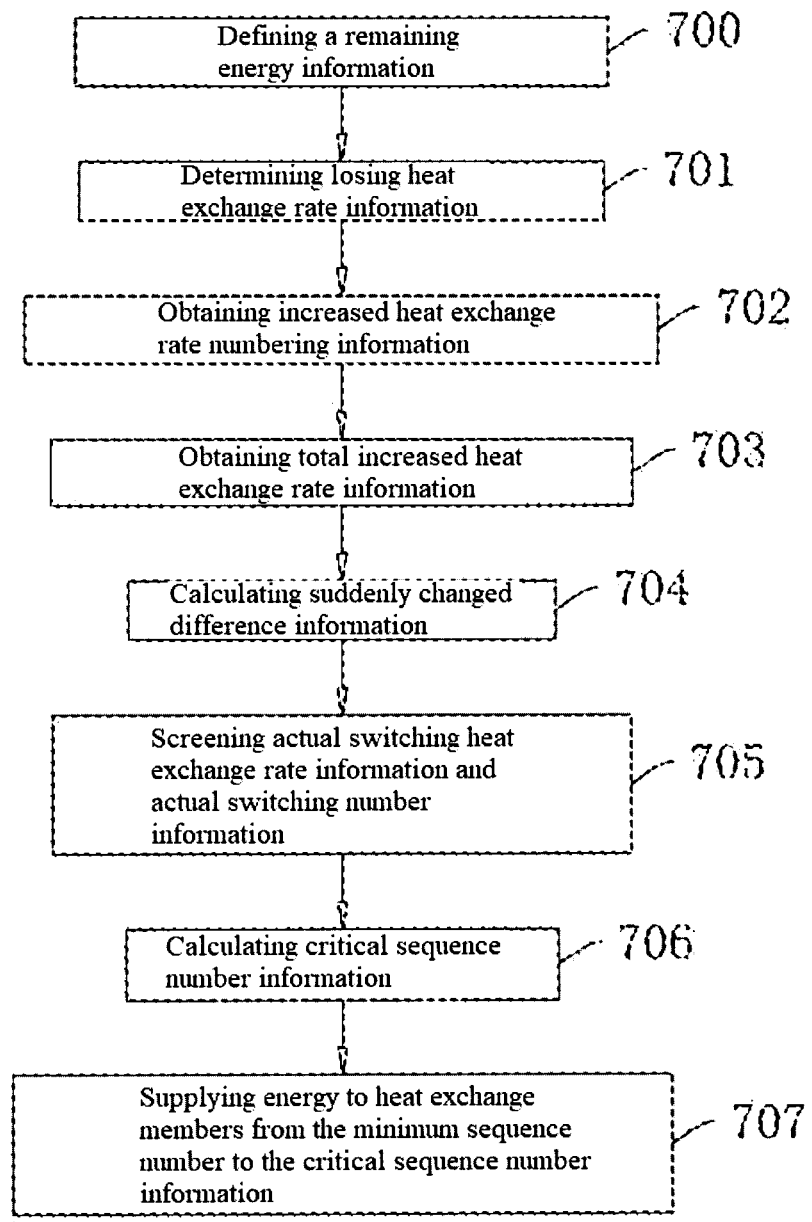
FIG. 7 is a flowchart of a method for inserting a heat exchange component corresponding to current replacement sequence number information in a preset energy storage area for energy storage and sets the energy storage sequence number information as minimum sequence number information in an embodiment of the present application.

Referring to FIG. 7, placing a current replacement member corresponding to the current replacement member number information in an insertion area corresponding to the insertion area information for energy storage and supplying energy to a heat exchange component having the minimum energy storage sequence number information includes:

step 700: defining the remaining energy storage information corresponding to the current replacement member number information as an removed remaining energy storage information.

The removed remaining energy storage information is an information of the energy storage of the whole heat exchange system which is instantaneously removed, namely instantaneous variation.

step 701: performing matching analysis on the heat exchange rate information stored in a consumption database and the removed remaining energy storage information to determine the heat exchange rate corresponding to the removed remaining energy storage information, and defining the heat exchange rate corresponding to each of the removed remaining energy storage information as a lost heat exchange rate information.

The lost heat exchange rate information is an information of the heat exchange rate on the curve for removing the remaining energy storage information at the removing time. The establishment of the database has already been described in the previous steps and will not be described herein.

step 702: sequencing the single-member heat exchange rate information according to the energy storage sequence number information to obtain a heat exchange rate increasing sequence number information.

The heat exchange rate increasing sequence number information is an information on the sequencing of the heat exchange components in a same heat exchange component cycling group after being sequenced according to the energy storage sequence number information. The sequencing is made according to the energy storage sequence number information.

step 703: calculating a sum of any number of the single-member heat exchange rate information according to the heat exchange rate increasing sequence number information to obtain a total increased heat exchange rate information of different number of the heat exchange components.

The total increased heat exchange rate information is a sum of the single-member heat exchange rate information corresponding to any number of heat exchange components selected sequentially from the small to the large heat exchange rate sequence number information. The calculating is made by continuous adding numerical values.

step 704: calculating an absolute value of a difference between the total increased heat exchange rate information and the lost heat exchange efficiency information, and defining the absolute value as a sudden change difference information.

The sudden change difference information is an absolute value of a difference between the total increased heat exchange rate information and the lost heat exchange efficiency information. The purpose of the calculation is to determine the distance value of the speed corresponding to the lost heat exchange efficiency information. The calculation is carried out by obtaining an absolute value by subtraction.

step 705: screening out total increased heat exchange rate information with a minimum absolute value, defining the total increased heat exchange rate information as an actual switching heat exchange rate information, and defining the number corresponding to the actual switching heat exchange rate information as an actual switching number information.

The actual switching heat exchange rate information is the total increased heat exchange rate information with a minimum absolute value. The actual switching number information is the quantity of single-member heat exchange rate information contained in the actual switching heat exchange rate information.

step 706: calculating a critical sequence number information according to the actual switching number information and a minimum sequence number information.

The critical sequence number information is an information of the last two added sequence number in the actual switching heat exchange rate information. The way of calculation includes adding the last two and minus one integer.

step 707: supplying energy to the heat exchange components corresponding to the information from the minimum sequence number information to the critical sequence number information.

Figure 8:
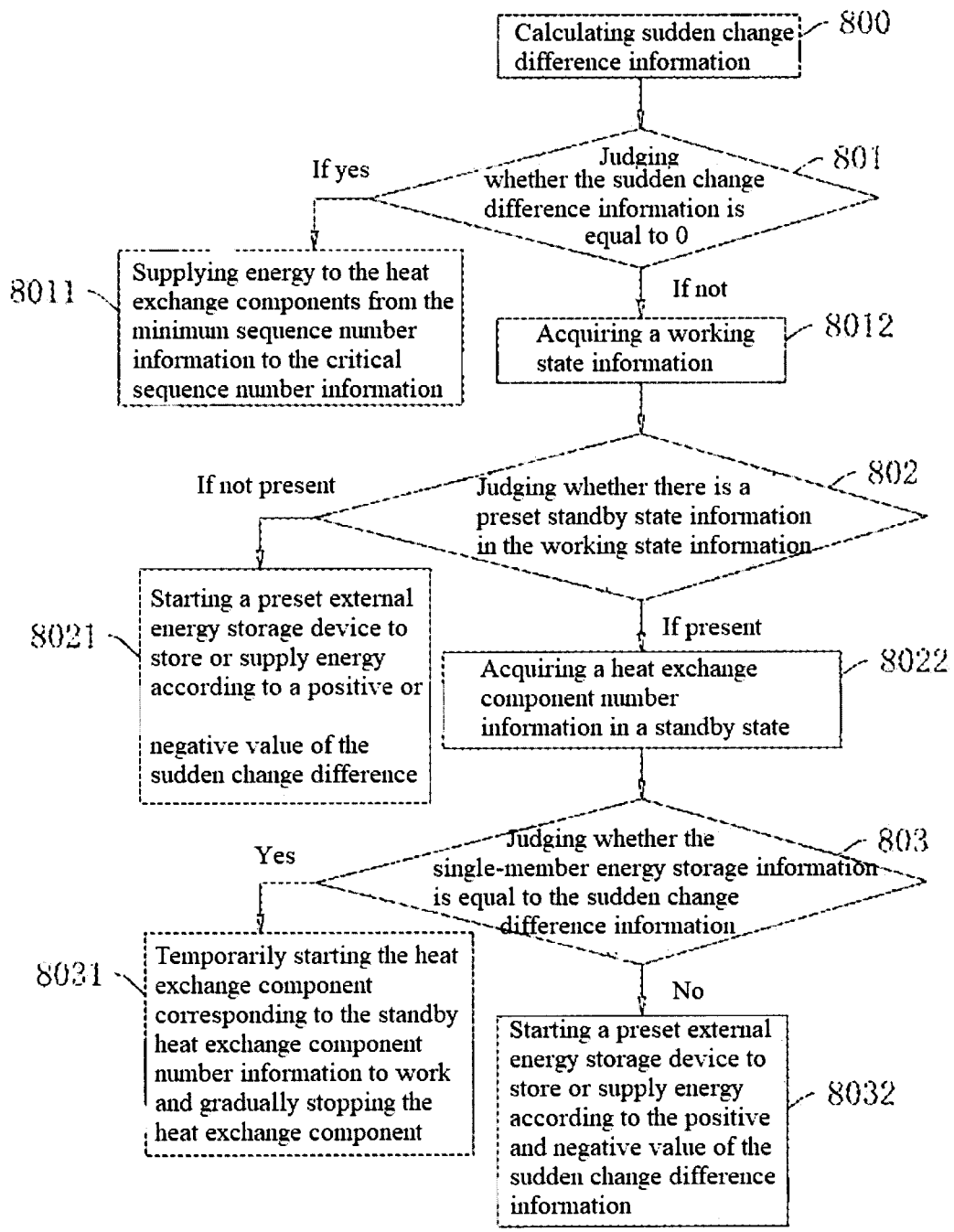
FIG. 8 is a flowchart of a method for supplying energy to heat exchange components from minimum sequence number information to critical sequence number information in an embodiment of the present application.

Referring to FIG. 8, the method for supplying energy to the heat exchange components corresponding to the information from the minimum sequence number information to the critical sequence number information includes:

step 800: calculating a difference between the actual switching heat exchange rate information and the lost heat exchange rate information, and defining the difference as a sudden change difference information.

The sudden change difference information is an information of a difference between actual switching heat exchange rate information and lost heat exchange rate information. Here, there is also a case of sudden fluctuation between the two information.

step 801: judging whether the sudden change difference information is equal to 0.

It is judged whether the situation is just suitable, without any fluctuation.

step 8011: if yes, supplying energy to the heat exchange components from the minimum sequence number information to the critical sequence number information.

If the sudden change difference information is equal to 0, the condition is just proper, and a direct replacement does not generate the condition of fluctuation unbalance, and the direct replacement is carried out.

step 8012: if the sudden change difference information is not equal to 0, acquiring working state information of all the heat exchange components.

The working state information is an information on whether the heat exchange component is in energy storing or in energy supplying. If not, it indicates that there is missing or redundant situation during the switching, and the following measures are required.

step 802: judging whether there is a preset standby state information in the working state information.

The standby state information is an information for non-operation, i.e., neither storing nor supplying energy. The purpose of the judgement is to determine whether there are idle heat exchange components.

step 8021: if there is no preset standby state information, starting a preset external energy storage device to store or supply energy according to a positive or negative value of the sudden change difference information.

If there is no preset standby state information, it is not possible to compensate the difference after the replacement by energy storing or supplying of the heat exchange components, and instead, the energy storage or energy supply can be performed according to the positive and negative value of the sudden change difference information by using the external energy storage device, which can be any kind of energy storage equipment.

step 8022: if there is a preset standby state information, acquiring the heat exchange component number information in the standby state, and defining this heat exchange component number information as a standby heat exchange component number information.

The standby heat exchange component number information is the heat exchange component number information in the standby state. It is acquired from state information set on each heat exchange component by coding and binding. If there is a preset standby state information, it is required to find the appropriate heat exchange component number information.

step 803: judging whether the single-member energy storage information of the standby heat exchange component number information is equal to the sudden change difference information.

The purpose of the judgment is to determine whether there is a energy storage information properly compensating the sudden change difference information, even although there is any standby heat exchange component.

step 8031: if yes, temporarily starting the heat exchange component corresponding to the standby heat exchange component number information to work and gradually stopping the heat exchange component.

If yes, it indicates that there is a corresponding standby heat exchange component that can be started to work, so that the heat exchange rates before and after replacement are kept consistent, avoiding a fluctuation.

step 8032: if no, starting a preset external energy storage device to store or supply energy according to the positive and negative value of the sudden change difference information.

If not, it indicates that there is a heat exchange component in standby state but it is still not usable, and the external energy storage device is still used for storing or supplying energy according to the positive or negative value of the sudden change difference information.

Figure 9:
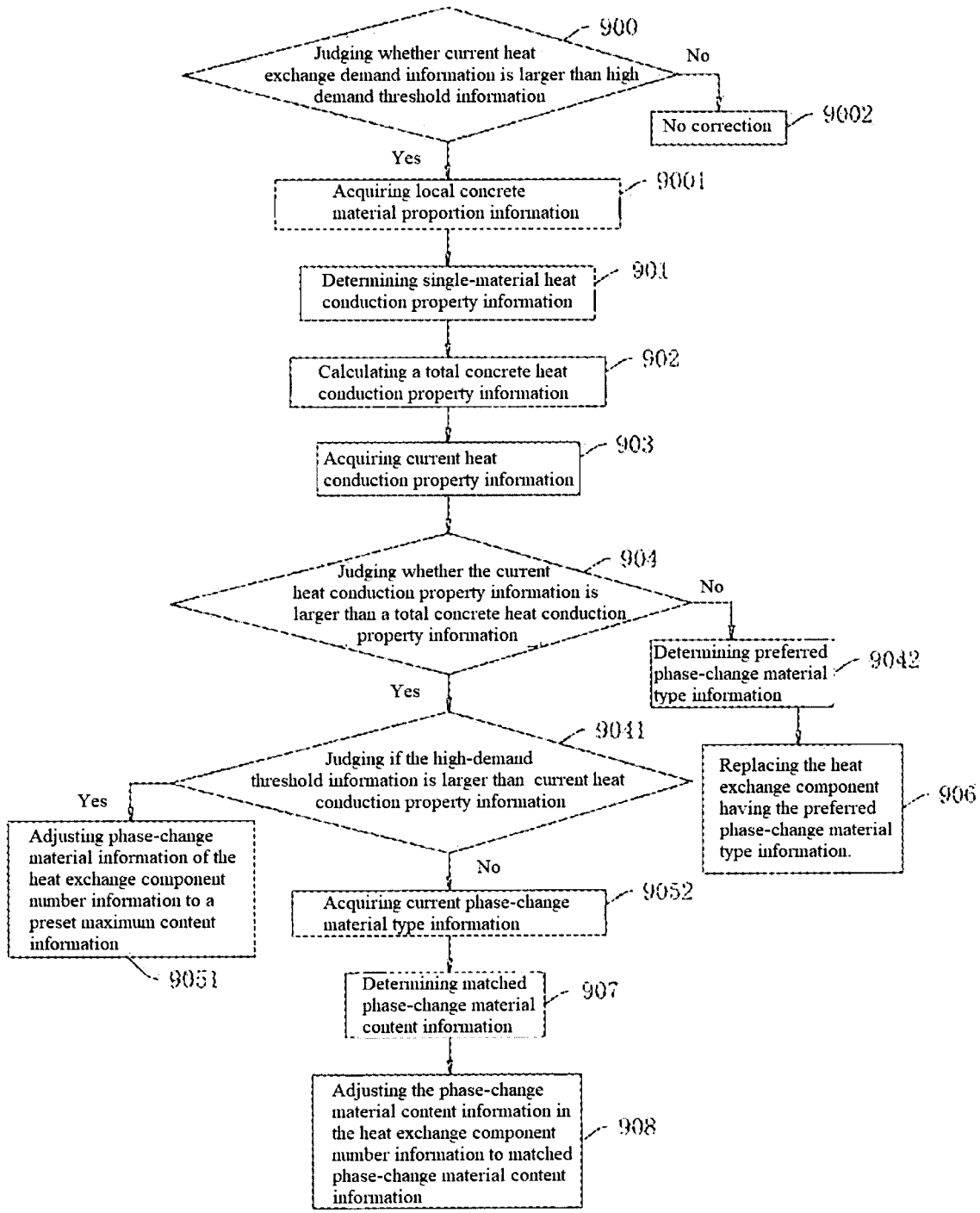
FIG. 9 is a flowchart of a method of determining a heat exchange component in an embodiment of the present application.

Referring to FIG. 9, a method for determining a heat exchange component is further included, including:

step 900: judging whether a numerical value of any point on the theoretical energy consumption demand curve information is larger than a preset high demand threshold information, and defining the numerical value of any point on the theoretical energy consumption demand curve information as a current heat exchange demand information.

The high-demand threshold information is a heat conduction and exchange efficiency required for the system, and is a data value manually set according to the demand of the actual application field. For example, an additional cooling equipment is required in areas with higher ambient temperatures, such as air conditioning facilities. The current heat exchange demand information is a numerical value of any point on the theoretical energy consumption demand curve information.

step 9001: if yes, acquiring local concrete material proportion information.

If yes, it indicates that the numerical value at this point is larger than preset high demand threshold information, and it is needed to judge whether the heat exchange component meets the requirement. The local concrete material proportion information is an information of the materials of the local concrete, including the types of mixed materials in the concrete. The mixed materials have certain differences according to the differences of reinforcing steel bars, stones, cement and other components and can be obtained by artificial observation and detection.

step 9002: if not, performing no adjustment.

If no, it indicates that there is no requirement for high power and high heat exchange efficiency needed in the time period is indicated, and any adjustment is not needed.

step 901: performing matching analysis on a heat conduction property information stored in the preset energy storage database and the current concrete material information to determine the heat conduction property corresponding to the current concrete material information, and defining the heat conduction property as the single-material heat conduction property information.

The single-material heat conduction property information is an information of the heat conduction property corresponding to any one material in the current concrete material information. The mapping relation between the heat conduction property information and the current concrete material information is stored in the database, which are results obtained by numerous workers through a large numbering of tests. When the system receives the current concrete material information, the corresponding heat conduction property is automatically retrieved from the database, and is output as the single-material heat conduction property information.

step 902: calculating a total concrete heat conduction property information according to the single-material heat conduction property information and the current concrete material proportion information.

The total concrete heat conduction property information is a total heat conduction property information obtained after mixing individual materials according to the proportion information. It is obtained by multiplying the single-material heat conduction property information and the current concrete material proportion information to obtain the heat conduction property of each of the materials, and then calculating a sum or difference according to the corresponding mutual influence effect and other reactions after mixing to obtain the total concrete heat conduction property information. Alternatively, it can be retrieved from a database, in which the heat conducting property under different proportions is stored.

step 903: acquiring the heat exchange component number information and the corresponding heat conduction property information, and defining the heat conduction property information as a current heat conduction property information.

The current heat conduction property information is an information of the current heat conduction property of the heat exchange component. It is acquired by manual measurement and input.

step 904: judging whether the current heat conduction property information is larger than a total concrete heat conduction property information.

step 9041: if yes, judging whether the high-demand threshold information is larger than the theoretical maximum information corresponding to the current heat conduction property information.

If yes, it indicates that the heat exchange demand can be met, and the heat conduction efficiency theoretically achieved by the heat exchange component through changing the material proportion inside can reach high-requirement threshold information.

step 9042: if the current heat conduction property information is smaller than the total concrete heat conduction property information, performing matching analysis on the phase-change material type information stored in a preset property database and the current phase-change material type information to determine the phase-change material type with a property higher than that of the current phase-change material type information, and defining the phase-change material type as a preferred phase-change material type information.

The optimal phase-change material type information is a phase-change material type information having a property superior to that of the current phase-change material type information. The database stores the mapping relation between the current phase-change material type information and the phase-change material type information with the property higher than that of the current phase-change material type information, and when the system receives the current phase-change material type information, the system automatically retrieves the phase-change material type information corresponding to the phase-change material type information better than that of the current phase-change material type information from the database and outputs the phase-change material type information. If the value is less than the preset value, it indicates that the type of the current phase-change material is not suitable, and needs to be replaced by the phase-change material with more excellent property and higher efficiency.

Present experimental data show that the improvement of heat conductivity can more satisfy the heat transfer demand than the improvement of heat storage nature, the phase-change material coefficient of heat conductivity of high latent heat is less than the concrete substrate mostly. If the heat transfer demand is big, considering that the heat conductivity who promotes the structure first, it can promote the holistic heat conductivity of structure to change phase-change material into the material that the heat conductivity is higher than the concrete substrate but relative latent heat is lower, lose less heat-retaining capacity relatively. If the phase-change material coefficient of change has the promotion but does not have the coefficient of heat conductivity of concrete substrate high, the whole structure is negative gain for ordinary pile foundation heat conduction still, the coefficient of heat conductivity of concrete substrate can be regarded as the datum line. If the whole heat transfer ability after high heat conduction phase-change material changes still cannot satisfy the demand, then consider to changing the material of the high heat conductivity of metal class to the cover intraductal, its coefficient of heat conductivity is far greater than the concrete substrate, promotion structure heat conductivity that can be great, has nevertheless abandoned the heat-retaining ability simultaneously. The whole process is that after the heat exchange requirement is increased, the heat conductivity coefficient of the concrete base material is taken as a reference line, materials with better heat conductivity are gradually replaced into the sleeve, and the heat storage capacity is replaced by the heat conductivity capacity.

step 9051: if the high-demand threshold information is larger than the theoretical maximum information corresponding to the current heat conduction property information, replacing the heat exchange component by a preset high heat conduction sleeve for heat exchange.

If the high-demand threshold information is larger than the theoretical maximum information corresponding to the current heat conduction property information, it indicates that the situation can't be avoided through changing phase-change material this moment, then can set up high heat conduction sleeve pipe temporarily through the external world and carry out the heat conduction to change the heat conduction material and carry out the heat conduction temporarily. If the gap is still too big, it can be directly by a metal material having a coefficient of heat conductivity much larger than the phase-change material.

step 9052: if the high-demand threshold information is smaller than the theoretical maximum information corresponding to the current heat conduction property information, acquiring the current phase-change material type information corresponding to the heat exchange component number information.

In this case, it indicates that the process can be performed by changing the proportion of the phase-change materials in the heat exchange component.

step 906: replacing the heat exchange component corresponding to the heat exchange component number information having the preferred phase-change material type information.

step 907: performing matching analysis on theoretical phase-change material content information stored in a preset content database, the current phase-change material type information and the high-demand threshold information to determine a theoretical phase-change material content corresponding to the current phase-change material type information and the high-demand threshold information, and defining the theoretical phase-change material content as matched phase-change material content information.

The matched phase-change material content information is an information of the material proportion which has higher heat conductivity than the current phase-change material type information and can reach the high-demand threshold information. The database stores the mapping relation of the theoretical phase-change material content information, the current phase-change material type information and the high-demand threshold information, and the mapping relation is obtained by observing and recording through a large number of calculations and actual tests by workers in the field. When the system receives the current phase-change material type information and the high-demand threshold information, the corresponding matched phase-change material content is automatically searched from the database, and the matched phase-change material content information is output.

step 908: adjusting the phase-change material content information in the heat exchange component number information according to the matched phase-change material content information.

Based on the same invention concept, an embodiment of the present application provides an efficient shallow geothermal energy utilization and storage system based on deep learning optimization.

Figure 10:
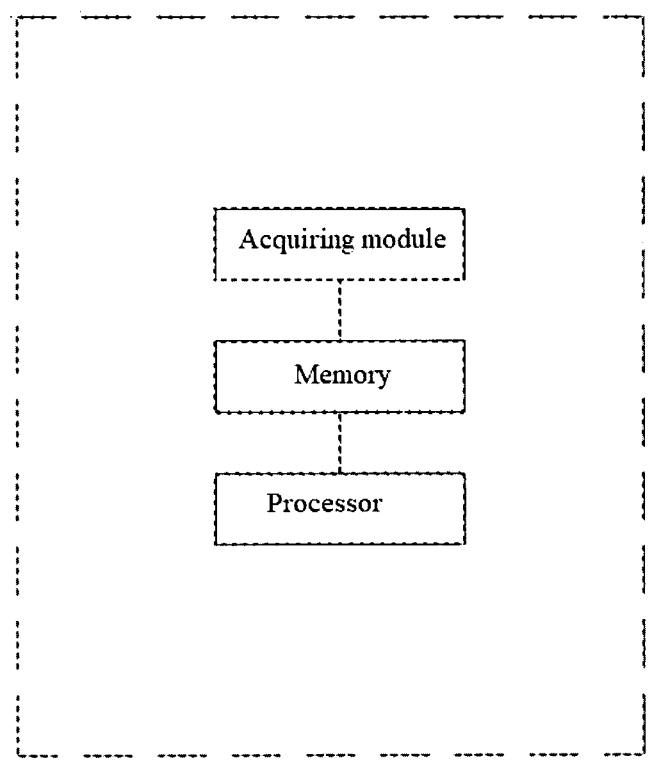
FIG. 10 is a system block diagram of an efficient shallow geothermal storage method based on deep learning optimization in an embodiment of the present application.

Referring to FIG. 10, the efficient shallow geothermal storage system optimized based on deep learning includes:

an acquiring module, configured for acquiring current time information, heat exchange component number information, single-member potential energy information, actual consumption rate information, actual material proportion information, sudden energy consumption demand curve segment information, remaining energy storage information, single-member energy storage information, insertion area information, historical record information and current heat conduction property information;

a memory, configured for storing a program of a control method of the efficient shallow geothermal energy utilization and storage method based on deep learning optimization; and a processor, configured for loading executing the program in the memory, and realizing the control method for the efficient shallow geothermal energy utilization and storage method based on deep learning optimization.

What is claimed is:

1. A shallow geothermal energy utilization and storage method based on deep learning optimization, comprising the following steps of:

acquiring current time information;

performing matching analysis on energy consumption demand curve information stored in a preset learning database and the current time information to determine an energy consumption demand curve for the current time information, and defining the energy consumption demand curve as theoretical energy consumption demand curve information;

acquiring heat exchange component number information and corresponding single-member potential energy information;

calculating single-member energy storage information according to the single-member potential energy information and preset efficiency threshold information;

calculating a sum of the single-member energy storage information corresponding to the heat exchange component number information to obtain a total stored energy information;

calculating replacement time information according to the theoretical energy consumption demand curve information and the total stored energy information; and replacing a heat exchange component corresponding to the heat exchange component number information at a replacement time corresponding to the replacement time information;

wherein replacing the heat exchange component corresponding to the heat exchange component number information at the replacement time corresponding to the replacement time information comprises the following steps:

performing matching analysis on heat exchange rate information and the single-member energy storage information stored in a preset consumption database and the current time information to determine a heat exchange rate corresponding to the single-member energy storage information at the current time information, and defining the heat exchange rate corresponding to the single-member energy storage information as single-member heat exchange rate information;

calculating single-member consumption time information according to the single-member heat exchange rate information and the single-member energy storage information;

judging whether the single-member consumption time information is equal to the replacement time information;

when the single-member consumption time information is equal to the replacement time information, placing the heat exchange component corresponding to the heat exchange component number information into a preset energy storage area for energy storage and moving the heat exchange component in the preset energy storage area out for energy storage at the replacement time information; and when the single-member consumption time information is smaller than the replacement time information, placing a heat exchange component corresponding to the heat exchange component number information into the preset energy storage area for energy storage at the single-member consumption time information, and moving the heat exchange component in the preset energy storage area out for energy storage at the replacement time information;

wherein placing the heat exchange component corresponding to the heat exchange component number information into the preset energy storage area for energy storage at the single-member consumption time information, and moving the heat exchange component in the preset energy storage area out for energy storage at the replacement time information comprises the following steps:

acquiring remaining energy storage information at the replacement time;

defining number information of the heat exchange component to be replaced as current replacement member number information;

performing matching analysis on cycling group number information stored in a preset group database and the current replacement member number information to determine a cycling group number in which the current replacement member number information is, and defining the cycling group number information as replacement cycling group number information;

acquiring the single-member energy storage information corresponding to other heat exchange components in the replacement cycling group number information, respectively, and defining the single-member energy storage information as the single-member energy storage information;

sequencing the remaining energy storage information and the single-member energy storage information corresponding to all the other heat exchange components in the replacement cycling group number information in a descending order to obtain a sequence number corresponding to the remaining energy storage information, defining the sequence number as energy storage sequence number information, and defining a minimum sequence number as minimum sequence number information;

acquiring position information of other heat exchange components corresponding to a sequence number adjacent to the energy storage sequence number information corresponding to the remaining energy storage information, respectively, and defining the position information as insertion area information; and placing a heat exchange component corresponding to the current replacement member number information in the insertion area information for energy storage, and supplying energy to a heat exchange component having the minimum sequence number information as energy storage number information;

wherein calculating the preset efficiency threshold information comprises the following steps:

acquiring historical record information;

retrieving latest historical efficiency threshold information and historical replacement time information from the historical record information;

performing matching analysis on the historical replacement time information and preset suitable time range information to determine larger historical replacement time information, suitable historical replacement time information and smaller historical replacement time information;

respectively calculating proportions of the larger historical replacement time information, the suitable historical replacement time information and the smaller historical replacement time information in the historical replacement time information, defining a proportion of the larger historical replacement time information as larger proportion information, defining a proportion of the suitable historical replacement time information as suitable proportion information, and defining a proportion of the smaller historical replacement time information as smaller proportion information;

judging whether the suitable proportion information is a maximum value;

when the suitable proportion information is the maximum value, outputting the preset efficiency threshold information as the latest historical efficiency threshold information;

when the larger proportion information or the smaller proportion information is the maximum value, performing calculation on the theoretical energy consumption demand curve information corresponding to the larger historical replacement time information or the smaller historical replacement time information corresponding to the maximum value, the total stored energy information and a proper time range information to obtain updated efficiency threshold information; and outputting the updated efficiency threshold information as the preset efficiency threshold information and updating the single-member energy storage information.

2. The shallow geothermal energy utilization and storage method based on deep learning optimization according to claim 1, wherein establishing the preset learning database comprises:

calculating theoretical consumption rate information according to the theoretical energy consumption demand curve information and the current time information;

acquiring an actual consumption rate information of the total stored energy information;

calculating a difference between the theoretical consumption rate information and the actual consumption rate information and defining the difference as consumption rate difference information;

judging whether the consumption rate difference information exceeds a range corresponding to preset allowable deviation range information;

when the consumption rate difference information exceeds the range corresponding to preset allowable deviation range information:

acquiring actual material proportion information;

performing matching analysis on single-material weight information stored in a preset proportion database and the actual material proportion information to determine a single-material weight corresponding to the actual material proportion information, and defining the single-material weight as material weight information;

calculating total weight information according to the actual material proportion information and the material weight information;

calculating corrected rate change data information according to the consumption rate difference information and the total weight information; and adjusting a mapping relation between the current time information and the theoretical energy consumption demand curve information in a target database according to the corrected rate change data information; and when the consumption rate difference information does not exceed the range corresponding to preset allowable deviation range information, performing no correction.

3. The shallow geothermal energy utilization and storage method based on deep learning optimization according to claim 2, wherein, when the consumption rate difference information exceeds the preset allowable deviation range information, the method for determining the theoretical energy consumption demand curve information comprises the following steps:

acquiring sudden energy consumption demand curve segment information in a time length corresponding to preset interval time length information;

find a same time period information according to the current time information;

randomly selecting a time length within the same time period information as a selected time period information of the preset interval time length information, and defining a starting time of the selected time period information as selected time information;

performing matching analysis on the energy consumption demand curve information stored in the preset learning database and the selected time information to determine an energy consumption demand curve for the selected time information, and defining the energy consumption demand curve as selected energy consumption demand curve information;

selecting a segment having a same length as that of the preset interval time length information in the selected energy consumption demand curve information, and defining the segment as a selected period curve information;

comparing the selected period curve information with the sudden energy consumption demand curve segment information to obtain curve coincidence degree information;

judging whether the curve coincidence degree information is larger than a preset theoretical coincidence range information;

when the curve coincidence degree information is larger than a preset theoretical coincidence range information:
analyzing the selected energy consumption demand curve information and the current time information to determine adjusted energy consumption demand curve information; and
updating the theoretical energy consumption demand curve information into the adjusted energy consumption demand curve information and outputting the adjusted energy consumption demand curve information; and when the curve coincidence degree information is not larger than a preset theoretical coincidence range information, reselecting selected time interval information and selected time information.

4. The shallow geothermal energy utilization and storage method based on deep learning optimization according to claim 1, wherein placing a current replacement member corresponding to the current replacement member number information in an insertion area corresponding to the insertion area information for energy storage and supplying energy to a heat exchange component having minimum energy storage sequence number information comprises the following steps:

defining the remaining energy storage information corresponding to the current replacement member number information as removed remaining energy storage information;

performing matching analysis on the heat exchange rate information stored in the preset consumption database and the removed remaining energy storage information to determine a heat exchange rate corresponding to the removed remaining energy storage information, and defining the heat exchange rate corresponding to each removed remaining energy storage information as lost heat exchange rate information;

sequencing the single-member heat exchange rate information according to the energy storage sequence number information to obtain heat exchange rate increasing sequence number information;

calculating a sum of any number of the single-member heat exchange rate information according to the heat exchange rate increasing sequence number information to obtain total increased heat exchange rate information of different number of heat exchange components;

calculating an absolute value of a difference between the total increased heat exchange rate information and the lost heat exchange rate information, and defining the absolute value as sudden change difference information;

screening out total increased heat exchange rate information with a minimum absolute value, defining the total increased heat exchange rate information as actual switching heat exchange rate information, and defining a number corresponding to the actual switching heat exchange rate information as actual switching number information;

calculating critical sequence number information according to the actual switching number information and a minimum sequence number information; and supplying energy to the heat exchange components corresponding to information from the minimum sequence number information to the critical sequence number information.

5. The shallow geothermal energy utilization and storage method based on deep learning optimization according to claim 4, wherein supplying the energy to the heat exchange components corresponding to the information from the minimum sequence number information to the critical sequence number information comprises the following steps:

calculating a difference between the actual switching heat exchange rate information and the lost heat exchange rate information, and defining the difference as the sudden change difference information;

judging whether the sudden change difference information is equal to 0;

when the sudden change difference information is equal to 0, supplying the energy to the heat exchange components from the minimum sequence number information to the critical sequence number information; and when the sudden change difference information is not equal to 0:
  acquiring working state information of all the heat exchange components;
  judging whether there is preset standby state information in the working state information;
  there is no preset standby state information, starting a preset external energy storage device to store or supply energy according to a positive or negative value of the sudden change difference information;
  when there is the preset standby state information, acquiring heat exchange component number information in a standby state, and defining the heat exchange component number information in the standby state as a standby heat exchange component number information;
  judging whether the single-member energy storage information of the standby heat exchange component number information is equal to the sudden change difference information;
  when the single-member energy storage information of the standby heat exchange component number information is equal to the sudden change difference information, temporarily starting the heat exchange component corresponding to the standby heat exchange component number information to work and gradually stopping the heat exchange component; and
  when the single-member energy storage information of the standby heat exchange component number information is not equal to the sudden change difference information, starting the preset external energy storage device to store or supply energy according to the positive and negative value of the sudden change difference information.

6. The shallow geothermal energy utilization and storage method based on deep learning optimization according to claim 2, further comprising determining the heat exchange component, comprising the following steps:
  judging whether a numerical value of any point on the theoretical energy consumption demand curve information is larger than preset demand threshold information, and defining the numerical value of any point on the theoretical energy consumption demand curve information as current heat exchange demand information; and
  when the numerical value of any point on the theoretical energy consumption demand curve information is larger than the preset demand threshold information:
    acquiring local concrete material proportion information;
    performing matching analysis on heat conduction property information stored in a preset energy storage database and the local concrete material proportion information to determine a heat conduction property corresponding to the local concrete material proportion information, and defining the heat conduction property as single-material heat conduction property information;
    calculating total concrete heat conduction property information according to the single-material heat conduction property information and the local concrete material proportion information;
    acquiring the heat exchange component number information and corresponding heat conduction property information, and defining the heat conduction property information as current heat conduction property information;
    judging whether the current heat conduction property information is larger than the total concrete heat conduction property information;
    when the current heat conduction property information is larger than the total concrete heat conduction property information, judging whether the preset demand threshold information is larger than theoretical maximum information corresponding to the current heat conduction property information;
    when the preset demand threshold information is larger than the theoretical maximum information, replacing the heat exchange component by a preset high heat conduction sleeve for heat exchange;
    when the preset demand threshold information is smaller than the theoretical maximum information, acquiring current phase-change material type information corresponding to the heat exchange component number information;
    performing matching analysis on theoretical phase-change material content information stored in a preset content database, the current phase-change material type information and the preset demand threshold information to determine a theoretical phase-change material content corresponding to the current phase-change material type information and the preset demand threshold information, and defining the theoretical phase-change material content as matched phase-change material content information;
    adjusting phase-change material content information in serial heat exchange component number information according to the matched phase-change material content information;
    when the preset demand threshold information is larger than the theoretical maximum information, performing matching analysis on phase-change material type information stored in a preset property database and the current phase-change material type information to determine a phase-change material type with a property higher than the current phase-change material type information, and defining the phase-change material type as preferred phase-change material type information;
    replacing a heat exchange component corresponding to the heat exchange component number information having the preferred phase-change material type information; and
    when the preset demand threshold information is larger than the theoretical maximum information, performing no adjustment.

7. A shallow geothermal energy utilization and storage system based on deep learning optimization, comprising
  a memory, configured for storing a program; and
  a processor, configured for executing the program in the memory to implement the control method for the shallow geothermal energy utilization and storage method based on deep learning optimization according to claim 1.

* * * * *